United States Patent [19]

Sullivan et al.

[11] Patent Number: 4,507,139
[45] Date of Patent: Mar. 26, 1985

[54] ACID TYPE SOLID UREA-NITRIC FERTILIZER

[75] Inventors: Jack M. Sullivan; Yong K. Kim, both of Florence; Kjell R. Waerstad, Tuscumbia, all of Ala.

[73] Assignee: Tennessee Valley Authority, Muscle Shoals, Ala.

[21] Appl. No.: 665,844

[22] Filed: Oct. 26, 1984

Related U.S. Application Data

[63] Continuation-in-part of Ser. No. 612,162, May 21, 1984.

[51] Int. Cl.³ .................. C05C 9/00; C05B 11/06
[52] U.S. Cl. ........................... 71/50; 71/29; 71/30; 564/32; 564/63
[58] Field of Search ............... 71/50, 29, 30; 564/63, 564/32; 423/162

[56] References Cited

U.S. PATENT DOCUMENTS 3,234,005  2/1966  Smalter et al. ................ 71/29

FOREIGN PATENT DOCUMENTS 1182058  9/1957  France.

Primary Examiner—William R. Dixon, Jr.
Assistant Examiner—C. Johnson
Attorney, Agent, or Firm—Robert A. Petrusek

[57] ABSTRACT

The present invention relates to the reaction of phosphate rock with nitric acid and urea to produce nitrogen-phosphorus containing slurries, which slurries, in turn, may be granulated and dried to produce solid N-P fertilizer products with agronomically advantageous low pHs (1.0–4.0). The products have excellent storage characteristics. The improved properties of these products result partially from the formation of a new compound, $Ca(H_2PO_4)(NO_3).CO(NH_2)_2$, which was discovered during the course of the investigation that led to the instant invention.

17 Claims, 1 Drawing Figure

PROCESS FOR UREA-NITRIC PHOSPHATES

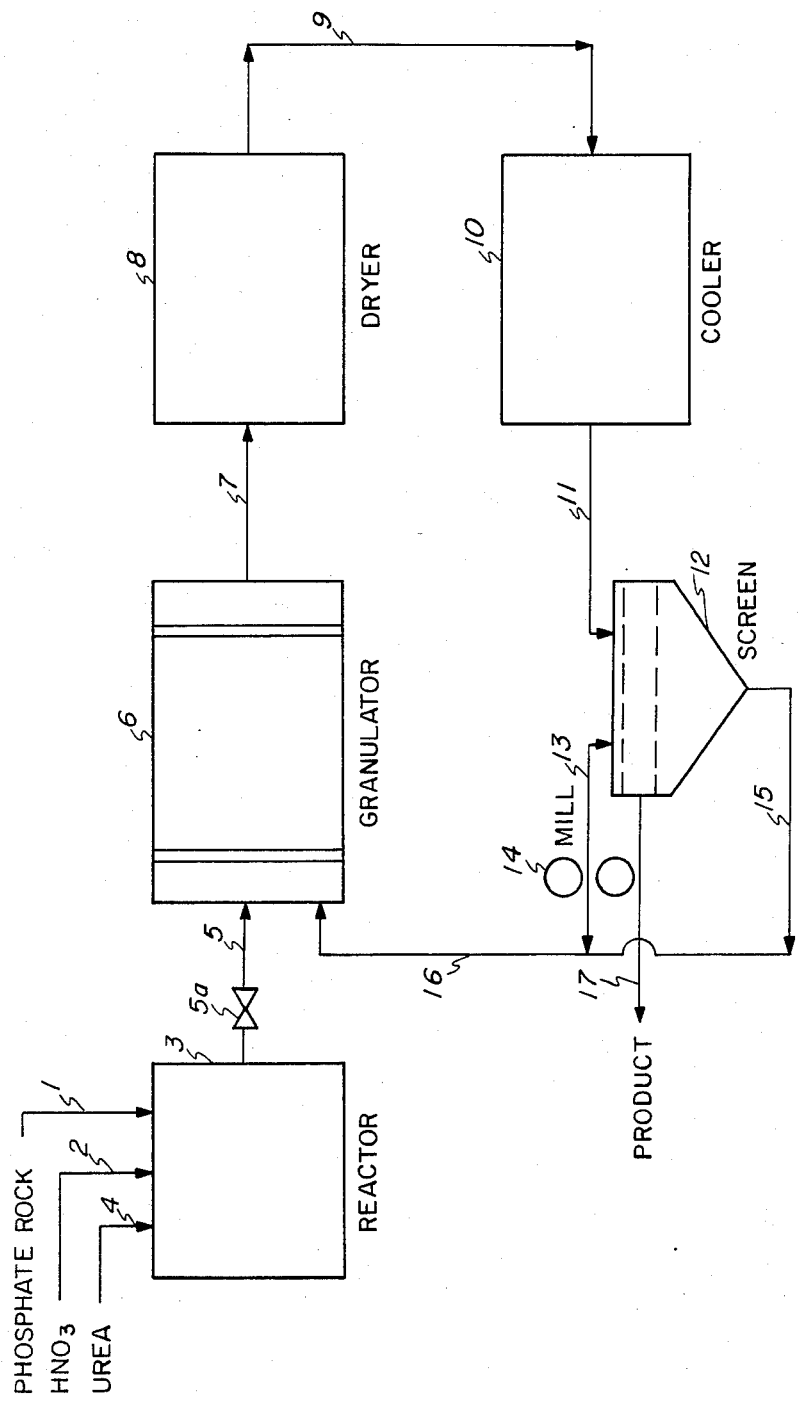

ACID TYPE SOLID UREA-NITRIC FERTILIZER

The invention herein described may be manufactured and used by or for the Government for governmental purposes without the payment to us of any royalty therefor.

This application is a continuation-in-part of application Ser. No. 612,162, filed May 21, 1984, for PROCESS FOR THE PRODUCTION OF SOLID UREA-NITRIC PHOSPHATE FERTILIZER PRODUCTS.

INTRODUCTION

The phosphate content of phosphatic ores is generally too insoluble for direct utilization by food-producing crops. Current phosphate fertilizer technology within the United States generally involves the reaction of phosphate ores with sulfuric acid to produce soluble phosphatic materials which may be further processed to produce a variety of fertilizer products. The sole function of the sulfuric acid is to solubilize the phosphate content of the ore while converting the calcium component to an insoluble calcium sulfate salt, usually gypsum ($CaSO_4.2H_2O$). Normally about five tons of gypsum is produced for each ton of $P_2O_5$ solubilized. This calcium sulfate byproduct is generally of little agronomic or commercial value and serves as a disposal and water pollution problem for the industry.

Oftentimes the cost of sulfur for sulfuric acid production dictates that the use of nitric acid as an acidulant for the processing of such phosphate ore be economically advantageous. Nitric acid offers an advantage over sulfuric acid in that it not only solubilizes the phosphatic component of the ore, but also supplies a nitrogen-containing anion (nitrate, $NO_3^-$) which may itself be incorporated in a final fertilizer product. Nitric phosphate processes are quite highly developed and are extensively used in the European countries. In many instances, the production cost of nitric phosphate fertilizers is lower than equivalent sulfuric acid-based products, depending, of course, on such other factors as location, cost, transportation, crops, application, etc.

Although such nitric phosphate fertilizers are characterized by a plethora of advantages over those produced by the acidulation of phosphate rock with sulfuric acid, they are still fraught with several distinct problems and disadvantages as produced by current prior-art practices. The present invention addresses the elimination of several of these significant drawbacks and disadvantages including the production of products having significantly lower hygroscopicities and higher water-soluble $P_2O_5$ contents per unit of nitric acid employed for acidulation. The incorporation therein of the gangue present in the phosphate ore acidulated in the production thereof, also eliminates the necessity of dealing with unwanted or unusable byproducts therefrom. Further, in developing the present invention, a new composition of matter has been identified and isolated which, because of the nature of its unusually high critical relative humidity, significantly improves upon the overall physical properties of the products resulting from the practice of the instant invention.

BACKGROUND OF THE INVENTION

1. Field of the Invention

From a technological standpoint, a major problem associated with the nitric acid acidulation of phosphate rock, as currently practiced, involves the production of the soluble byproduct, calcium nitrate, which renders the fertilizer products hygroscopic and generally difficult to store. Furthermore, the presence of soluble calcium causes the reversion of phosphate to low-water and citrate-soluble forms (dicalcium phosphate and apatite) when the resulting acidulates are subsequently neutralized with ammonia and granulated to produce solid N-P fertilizer products. In practice, these problems may be circumvented by removal of part of the calcium by refrigeration-crystallization (Odda Process); by reaction of the calcium with supplemental phosphoric acid (Phosphonitric Process); or by precipitation with sulfate (Sulfonitric Process) [A. V. Slack et al., Farm Chemicals, Vol. 130, Nos. 4, 5, 6 and 7 (April, May, June, and July, 1976)]. However, refrigeration-crystallization processes are complex and require high capital investment per ton of product and high operating cost because of high energy requirements. Also, it is difficult to economically dispose of some of the byproducts (calcium carbonate or gypsum) from the other processes.

2. Prior Art

A number of prior-art investigations concerning the reactions of nitric acid and urea with phosphate ore have been reported in the scientific and patent literature. Initial work was conducted by Nagai and his co-workers in the early 1950s [S. Nagai and T. Kanasawa, J. Chem. Soc., Japan, Ind. Chem. Sect., 54, 39 (1951); S. Nagai, T. Kanasawa, and K. Saito, J. Chem. Soc. Japan Ind. Chem. Sect., 54, 210 (1951); S. Nagai, T. Kanasawa, and K. Sakurada, J. Chem. Soc. Japan, Ind. Chem. Sect., 54, 611 (1951)]. These workers investigated the properties of reaction products produced in the pure component system $Ca_3(PO_4)_2$—$CO(NH_2)_2$—$HNO_3$ and determined that the urea adducts: "cal urea" [$CaNO_3.4CO(NH_2)_2$], and urea nitrate [$CO(NH_2)_2.HNO_3$] were the primary reaction products. They further extended their studies to include the addition of various quantities of urea to nitric acid acidulates of phosphate ore and concluded that products containing about 24-25 percent total N (urea-N ~19-20 percent, $NO_3$-N ~4.5 percent) and about 9-10 percent $P_2O_5$ offered the best physical properties for consideration as possible N-P fertilizer products. However, the critical relative humidities of these materials were not reported.

Japanese patents No. Sho 26-767, February 1951, and No. Sho 28-3169, July 1951, describe processes for the acidulation of phosphate ore with nitric acid followed by the addition of urea and calcium or potassium salts to produce nonhygroscopic granular fertilizers.

Guillet et al, in French Pat. No. 1,107,730, January 1956, describe the reaction of urea with hydrated calcium nitrate containing nitric and phosphoric acids to produce $Ca(NO_3)_2.4CO(NH_2)_2$. This product was used in combination with $Ca^{+2}$, $NH_4^{+1}$, and $P_2O_5$ containing salts to produce N-P fertilizers. Further work (French Pat. No. 1,182,058, June 1959) describes the reaction of phosphate rock with $HNO_3$ and urea to give an improved N-P fertilizer containing a complex mixture of urea calcium nitrate [$Ca(NO_3)_2.(CO(NH_2)_2)_4$], urea phosphate [$CO(NH_2)_2.H_3PO_4$], urea nitrate [$CO(NH_2)_2.HNO_3$], and dicalcium phosphate ($CaHPO_4$). The improved physical properties of this N-P fertilizer material resulted from the formation of urea adducts with nitrate, phosphate, and calcium present within the solid reaction mixture.

In 1963 Russian investigators [Ya. S., Shenken, V. A. Klevke, and B. G. Lyudkovskaya, Dokl. Akad. Nuak. SSSR 149, 656–9 (1963)] studied mixtures of calcium nitrate, phosphoric acid, and urea at 1:1 ratios of urea to phosphoric acid and calcium nitrate. The primary products were urea nitrate [$CO(NH_2)_2.HNO_3$] and monocalcium phosphate [$Ca(H_2PO_4)_2.H_2O$]. Addition of more urea resulted in the formation of $Ca(NO_3)_2.4CO(NH_2)_2$.

In 1964 this Russian study, supra, was extended to include an x-ray and thermodynamic investigation [Ya. S. Shenkin and V. A. Klevke, Khim. Prom-st, No. 1, 57 (1964)] of various $Ca(NO_3)_2.4H_2O$, $H_3PO_4$, and $CO(NH_2)_2$ mixtures. This study again showed presence of $CO(NH_2)_2.HNO_3$, $Ca(NO_3)_2.4CO(NH_2)_2$, $CO(NH_2)_2.H_3PO_4$, $CaHPO_4$, and $Ca(H_2PO_4)_2.H_2O$ as products of the reactions and also established the existence of retrograde equilibria such as: $Ca(H_2PO_4)_2 + Ca(NO_3)_2 + 2CO(NH_2)_2 \rightleftharpoons 2CaHPO + 2[CO(NH_2)_2.HNO_3]$; $Ca(H_2PO_4)_2 + 2[CO(NH_2)_2.HNO_3] + 4CO(NH_2) \rightleftharpoons (Ca(NO_3)_2.4CO(NH_2)_2 + 2[CO(NH_2)_2.H_3PO_4]$; and $CaHPO_4 + 2[CO(NH_2)_2.HNO_3] + 3CO(NH_2)_2 \rightleftharpoons Ca(NO_3)_2.4CO(NH_2)_2 + CO(NH_2)_2.H_3PO_4$ as water is removed from the system to produce solid products. However, these investigators failed to identify the presence of the new triple component adduct, $Ca(H_2PO_4)(NO_3).CO(NH_2)_2$ discovered during the present investigation. This new compound has a very high critical relative humidity (69 percent), almost as good as pure urea (75 percent), which improves the physical properties of the final products tremendously. In addition to this, $P_2O_5$ in the compound is 92 percent water soluble and completely available to plant growth (citrate solubility = 100 percent). Also, the new compound is acidic when dissolved in water (pH = 3.08) such that it possesses all the benefits of other acidic fertilizers.

Subsequently, Frazier et al (A. W. Frazier, J. R. Lehr, and J. P. Smith, Agr. and Food Chem., Vol. 15, No. 2, page 345, Mar./Apr. 1967) were able to isolate and characterize a new double salt adduct, urea-monocalcium phosphate [$Ca(H_2PO_4)_2.4CO(NH_2)_2$], from $CaO-P_2O_5-CO(NH_2)_2-H_2O$ systems.

Kochemba et al, U.S.S.R. 775,096, October 1980, concerned themselves with the reaction of phosphate rock with nitric acid followed by the addition of a $SO_4^-$ component and urea to produce a N-P fertilizer product. This work was followed by a publication (Yu. I., Kochemba and Ya. S. Shenkin, Zhurnal Prikladonoi Khimii, Vol. 55, No. 5, pp. 977–980, May 1982) in which KCl and $NH_3$ are incorporated into the reaction products to produce a urea-N-P-K fertilizer.

Stoller, U.S. Pat. No. 4,315,763, describes some of the applications and agronomic advantages of low pH solution fertilizers (<4.0). The Tennessee Valley Authority has conducted extensive research using low pH urea phosphate fertilizers for application on different types of soils and this research generally shows that there is an agronomic advantage for the use of low pH fertilizer on some soil systems. The products from the instant invention not only have a low pH, but they also contain the highly valuable nitrate nitrogen source. Nitrate nitrogen is a form of nitrogen which is less likely to be lost by evaporation and more likely to be absorbed directly by the roots of a growing crop.

SUMMARY OF THE INVENTION

The instant invention relates to the discovery of a new composition of matter having an unusually high critical relative humidity which is comparable to that exhibited by urea and which imparts to the overall product resulting from the practice of the instant invention the advantage of having significantly improved physical properties over and above that which may be realized by the practice of prior-art teachings relating to the production of solid nitric phosphate fertilizer materials. As pointed out by Hoffmeister (G. Hoffmeister, "Physical Properties of Fertilizers and Methods for Measuring Them," TVA Bulletin Y-147, October 1979, page 13), the critical relative humidity of a salt is that relative humidity of air at which the partial vapor pressure of water in the air exactly equals the equilibrium water vapor pressure above a saturated solution of the salt at any given temperature. In developing the instant invention, it was discovered that the combination of urea with nitric acid results in the conversion of phosphate rock ultimately to N-P fertilizer products which avoid the plethora of problems normally associated with the conversion of phosphate rock with nitric acid or combinations of nitric acids and sulfuric acid followed by the addition of ammonia.

In practicing the dictates of the instant process as it relates to the present invention, a new composition of matter was isolated and identified, which is the triple component adduct, $Ca(H_2PO_4)(NO_3).CO(NH_2)_2$. This newly discovered adduct exhibits an extremely high critical relative humidity to the point of being comparable to that attributed to pure urea and results in significantly improving the production of the final phosphate fertilizer material and, in addition, all of the $P_2O_5$ values in said adduct are water (92%) and citrate soluble (100%) and thus readily available to the growing plant.

OBJECTS OF THE INVENTION

A principal objective of the present invention is to provide an acid-type, economical and simple process which uses nitric acid and urea to convert phosphate rock to solid N-P fertilizer products, while at the same time avoiding the problems normally associated with the practice of current available nitric phosphate- and sulfur-based technologies. The products resulting therefrom have low pHs which may have agronomic advantages when used correctly on crops and soils. In practicing the process of the instant invention, care is taken to control reaction temperatures and ratios of reacting constituents to effect production of urea-calcium phosphate-calcium nitrate-phosphate acid-nitric acid complexes or adducts (one of which was discovered by us) which have much lower hygroscopicities and pHs than are currently available from processes of the prior art. The product of the instant invention will also have a much higher water-soluble $P_2O_5$ content than normally produced by current nitric phosphate processes.

A further object and advantage of the present invention is that in the practice thereof, all components utilized in the manufacturing process, including the trace metals and quartz or gangue present in the phosphate ore, are incorporated in the final products. Hence, no "throw-away" by-products are produced and trace elements (micronutrients) beneficial to growing plants are provided.

In addition to these objects and advantages, the acidic nature of the fertilizer products realized by the practice of the present invention provides local "micro sites" of low pH within the soil system which are effective in preventing the loss of ammonia produced by the urease-promoted hydrolysis of urea [J. K. R. Gasser and A.

Penny, J. Agric. Sci., Camb. (1967), 69, 139–146; J. M. Bremner and L. A. Douglas, Soil Sci. Soc. Amer. Proc., Vol. 35, 1971, pp. 575–578].

DESCRIPTION OF THE DRAWING

The present invention, together with further objects and advantages thereof, will be better understood from a consideration of the following description taken in connection with the accompanying drawing in which:

The FIGURE is a flow diagram of the instant invention process and the preferred embodiments thereof.

The simplicity and advantages of the instant invention are easily understood by examination of the flow diagram for the process as shown in the FIGURE. Ground phosphate rock and nitric acid from sources not shown are fed via lines 1 and 2, respectively, into reactor 3, where acidulation is allowed to proceed at temperatures of about 60°–70° C. for a period of time ranging from about 30 minutes to about 2 hours. Subsequently, urea, also from a source not shown, is added via line 4 into reactor 3 and therein thoroughly stirred into the acidulate over a period of time ranging from about one to about two hours, during which time the melt resulting and maintained in reactor 3 is allowed to cool to a temperature ranging from about 35° C. to about 45° C. An alternative procedure involves the simultaneous addition of phosphate rock, nitric acid, and urea via lines 1, 2, and 4, respectively, to reactor 3, in which case the reaction is allowed to proceed at temperatures of about 50°–60° C. for a period of time of about 1 to about 4 hours.

Still subsequently, the melt in reactor 3 is then passed via line 5 and means for control of flow 5a to drum granulator 6, or other granulation devices familiar to those knowledgeable in this art. After processing in granulator 6, the product is passed via lines 7, 9, and 11 to dryer 8, cooler 10, and screens 12, respectively. The oversize product is passed via line 13 to ball mill 14, or other such device, and along with the undersize product via line 15 passed via line 16 to granulator 6. Onsize product is sent via line 17 to storage, not shown. An alternative procedure for practice of the instant invention involves partial drying of the melt prior to granulation, in which case a dryer is placed (not shown) between reactor 3 and granulator 6. If drying is completed within the granulator, then a dryer subsequent to the granulator is not required.

DESCRIPTION OF THE PREFERRED EMBODIMENT

The process of the present invention and the practice thereof are capable of producing a variety of products depending upon the grade, storage characteristics, agronomic properties, and handling properties required by the producer. In general, the physicochemical properties of the products are determined by careful control of the molar $HNO_3$:CaO acidulation ratio and the molar ratio $CO(NH_2)_2$:CaO utilized in the manufacturing process and are strongly dependent upon the ratios of the urea adducts such as: $Ca(H_2PO_4)(NO_3) \cdot CO(NH_2)_2$, $Ca(NO_3)_2 \cdot 4CO(NH_2)_2$, $CO(NH_2)_2 \cdot H_3PO_4$, $Ca(H_2PO_4)_2 \cdot 4CO(NH_2)_2$, and $CO(NH_2)_2 \cdot HNO_3$ in the final product, as will be demonstrated presently.

In principle, the molar ratios of $HNO_3$:CaO and $CO(NH_2)_2$:CaO may be varied over quite wide ranges. A general recipe for the production of urea-nitric phosphate fertilizer materials based upon the use of one ton of nitric acid (as 100 percent $HNO_3$) and dependent upon the desired molar ratios of $HNO_3$:CaO and $CO(NH_2)_2$:CaO is given below.

$$\text{Tons diluted HNO}_3 = \frac{100}{(\text{wt \% concentration of HNO}_3)}$$

$$\text{Tons of phosphate rock} = 89 \times \frac{1}{(\text{desired ratio HNO}_3\text{:CaO})} \times \frac{1}{(\% \text{ CaO in phosphate rock})}$$

$$\text{Tons of urea} = 0.0107 \times (\text{tons phosphate rock}) \times (\% \text{ CaO in phosphate rock}) \times [\text{desired ratio CO(NH}_2)_2\text{:CaO}]$$

EXAMPLES

In order that those skilled in the art may better understand how the present invention can be practiced, the following examples are given by way of illustration but not necessarily by way of limitation.

The chemicals employed in the test illustrated in these examples were of reagent grade and were used without further purification, unless otherwise specified in the specific examples given below. The phosphate ore was of Central Florida origin and had the following composition: 30.8 percent $P_2O_5$, 45.2 percent CaO, 1.21 percent $Al_2O_3$, 1.34 percent $Fe_2O_3$, 0.37 percent MgO, 8.8 percent $SiO_2$, 3.63 percent F, 0.09 percent $K_2O$, 0.66 percent $Na_2O$, 3.4 percent total carbon, 70 ppm Cl, 125 ppm U, 96 ppm V, 61 ppm Cr, and 830 ppm $TiO_2$. The rock was ground to 55.8 percent -200 mesh. All acidulations were conducted with 56.8 percent $HNO_3$ (density: 1.343 g/mL). Chemical analyses were conducted using standard AOAC procedures. Critical relative humidity measurements were conducted using a vacuum system fitted with a U-tube monometer constructed from 10-mm Pyrex tubing and filled with No. 6428-R15 silicon fluid (density=0.9586 g/mL). Water vapor pressures were measured at 25.0° C. over a finely ground 1.00-g sample to which 30 μL (2.9 percent) water had been added. Melting points were measured using an Electrothermal Melting Point Apparatus. X-ray diffraction spectra were measured using a Phillips x-ray refractometer.

COMPARATIVE EXAMPLE I

Table 1 below demonstrates the improved physical properties, particularly with regard to moisture stability, which may be achieved by reacting urea with the individual components normally present in nitric acid acidulates of phosphate ore.

TABLE I

| | | Comparative Examples of Pure Chemical Compounds | | | |
|---|---|---|---|---|---|
| Sample No. | Compound | Melting point, °C. | Grade N—$P_2O_5$—$K_2O$, wt % | Critical relative humidity at 25° C., % | Abbreviated designation |
| 1 | $Ca(NO_3)_2 \cdot 4H_2O$ | 42.7 | 11.9—0—0 | 49.9 | CaN |
| 2 | $Ca(NO_3)_2 \cdot 4CO(NH_2)_2$ | 157–161 | 34.1—0—0— | 67.9 | CaNU |
| 3 | $CO(NH_2)_2$ | 132.7 | 46.6—0—0 | 75.0 | U |
| 4 | $NH_4NO_3$ | 169.6 | 35.0—0—0 | 61.9 | AN |

TABLE I-continued

| | | Comparative Examples of Pure Chemical Compounds | | | |
|---|---|---|---|---|---|
| Sample No. | Compound | Melting point, °C. | Grade N—$P_2O_5$—$K_2O$, wt % | Critical relative humidity at 25° C., % | Abbreviated designation |
| 5 | $CO(NH_2)_2.HNO_3$ | 158–159 | 34.1—0—0 | 90.3 | UN |
| 6 | $CO(NH_2)_2.H_3PO_4$ | 114–118 | 17.7—44.9—0 | 81.9 | UP |
| 7 | $Ca(H_2PO_4)_2.4CO(NH_2)_2$ | 75–115 | 23.4—29.7—0 | 60.3 | CaUP |
| 8 | $Ca(H_2PO_4)(NO_3).CO(NH_2)_2$ | >360 | 16.3—27.5—0 | 68.9 | N |

Samples 1, 3, and 4 of $Ca(NO_3)_2.4H_2O$, $CO(NH_2)_2$, and $NH_4NO_3$ were reagent-grade compounds and tested without further purification.

"Cal-Urea," $Ca(NO_3)_2.4CO(NH_2)_2$ (sample No. 2), referred as CaNU, was prepared by adding 25.00 g of ground $Ca(NO_3)_2.4H_2O$ to a 200 mL beaker followed by the addition of 25.43 g of powdered urea. The calcium nitrate and urea were thoroughly mixed. The sample immediately became moist and formed a thick slurry. After standing for several hours, the beaker was placed in a convection oven at 75° C. for a period of two days. The sample was then ground to a fine powder and vacuum dried at room temperature. X-ray and microscopic examination showed the material to be essentially pure $Ca(NO_3)_2.4CO(NH_2)_2$.

Urea nitrate, $CO(NH_2)_2.HNO_3$ (sample No. 5), referred to as UN, was prepared by adding 72.24 g of 71 percent $HNO_3$ to an ice-chilled 400-mL beaker. Urea then was added in small portions with removal of the beaker from the ice bath after each addition to allow reaction to occur. This process was continued until 50.00 g of urea was added. The solution was allowed to stand at room temperature for two hours. The product was filtered and air-dried under suction. It was then recrystallized from 50 mL of water, filtered, air-dried under suction, and oven-dried at 75° C. Chemical analysis indicated 22.79 percent urea-N and 11.46 percent $NO_3$-N (theoretical: 22.76 percent urea-N and 11.38 percent $NO_3$-N. The product was identified by x-ray and microscopic examination as urea nitrate.

Urea phosphate, $CO(NH_2)_2.H_3PO_4$ (sample No. 6), referred as UP, was prepared by adding 160.47 g of 85 percent $H_3PO_4$ to 76.00 g of granular urea and heating gently until reaction commenced. The heat was turned off and the solution allowed to stir for a period of two hours. The product was filtered and recrystallized twice, first from 40 mL and then from 15 mL of water, respectively. The product was air-dried under vacuum suction and then vacuum dried at room temperature. Chemical analysis gave 17.7 percent N and 44.8 percent $P_2O_5$ (theoretical: 17.7 percent N and 44.9 percent $P_2O_5$). X-ray and microscopic analysis identified the product as $CO(NH_2)_2.H_3PO_4$.

The urea adduct of monocalcium phosphate, $Ca(H_2PO_4)_2.4CO(NH_2)_2$ (sample No. 7), or referred to as CaUP, was prepared by adding 25.00 g of $Ca(H_2PO_4)_2.H_2O$ (referred to as CaP) to a 100-mL beaker followed by the addition of 23.83 g of powdered urea. The sample was thoroughly mixed to give a moist tacky solid. Enough distilled water was added to form a thick slurry. After standing for two hours, the sample was vacuum dried overnight at room temperature, finely ground, and again vacuum dried overnight. X-ray and microscopic examination showed the sample to contain $Ca(H_2PO_4)_2.4CO(NH_2)_2$ as the major phase with minor phase consisting of urea phosphate, $CO(NH_2)_2.H_3PO_4$.

The triple component adduct, $Ca(H_2PO_4)(NO_3).CO(NH_2)_2$ (sample No. 8), which is designated as N, is a new compound discovered by us during the course of the investigation that led to the discoveries of the instant invention. A pure sample of this compound was prepared as follows: 68 percent nitric acid (13.1 mL) was added to 12.4 g of powdered hydroxy apatite, $Ca_{10}(PO_4)_6(OH)_2$, and stirred to form a viscous paste. About 2 mL of water was stirred into the mixture to make it more fluid. Finely ground urea (12.0 g) was gradually added and stirring was continued for about 10 minutes. The reaction mixture was then suspended in 300 mL of acetone and suction filtered on a coarse glass frit. The filter cake was washed with three 50-mL portions of acetone and dried on the filter at room temperature to give 19.4 g of dried solid. The product had the following composition: % Ca=15.3, % P=12.0, % C=4.69, % $NO_3$-N=4.9, % urea-N=10.9 (theoretical: % Ca=15.33, % P=12.00, % C=4.69, % $NO_3$-N=5.43, % urea-N=10.85). The $P_2O_5$ content of the product was 92.4 percent water soluble and 100 percent citrate soluble. The compound did not melt at temperatures up to 360° C. Its critical relative humidity was 68.9 percent. The compound exhibited a unique x-ray powder diffraction pattern as shown in Table I-A below.

TABLE I-A

| X-Ray Powder Diffraction Pattern of $Ca(H_2PO_4)(NO_3)$ $CO(NH_2)_2{}^a$ | | | |
|---|---|---|---|
| d, Å | I/Io | d, Å | I/Io |
| 12.45 | 100 | 2.319 | 7 |
| 5.12 | 18 | 2.178 | 7 |
| 4.73 | 12 | 2.078 | 3 |
| 4.63 | 8 | 2.071 | 3 |
| 4.61 | 5 | 1.991 | 1 |
| 4.135 | 9 | 1.971 | 2 |
| 3.914 | 20 | 1.922 | 3 |
| 3.902 | 35 | 1.829 | 1 |
| 3.875 | 40 | 1.790 | 2 |
| 3.214 | 27 | 1.775 | 4 |
| 3.170 | 16 | 1.691 | 3 |
| 3.140 | 45 | 1.568 | 2 |
| 3.105 | 20 | 1.460 | 1 |
| 2.915 | 3 | 1.397 | 1 |
| $2.844^b$ | 19 | 1.281 | 1 |
| 2.720 | 2 | 1.273 | <1 |
| $2.644^b$ | 14 | 1.242 | <1 |
| 2.558 | 2 | 1.217 | 1 |
| 2.505 | 11 | | |

$^a$d-spacing corrected with NBS No. 640 (Si powder) as internal standard.
$^b$Broad reflection.

EXAMPLE II

Table II below gives the physicochemical properties of solid urea-nitric phosphate fertilizer products prepared by reacting phosphate rock with nitric acid at a molar ratio, $HNO_3$:CaO=1.2, followed by the addition of urea to give molar ratios of $CO(NH_2)_2$:CaO ranging from 1.6 to 3.8.

The samples were prepared as follows: Ground phosphate rock (12.52 g) was weighed into each of twelve 250-mL beakers. Ten mL (13.43 g) of 56.8 percent $HNO_3$ was pipetted into each beaker. A small amount of distilled water was added to ensure complete wetting of the samples. The samples were heated at 65° C. for a period of one hour. Ground urea (9.69, 10.91, 12.12, 13.33, 14.54, 15.75, 16.97, 18.17, 19.39, 20.60, 21.81, and 23.03 g, respectively) was added to each beaker to give ratios urea:CaO of 1.6, 1.8, 2.0, 2.2, 2.4, 2.6, 2.8, 3.0, 3.2, 3.4, 3.6, and 3.8, respectively. The samples were thoroughly stirred and enough distilled water was added to form a thick slurry and to ensure complete mixing of the ingredients. The samples then were vacuum dried at room temperature, ground to a fine powder and again vacuum dried.

urea to give molar ratios of $CO(NH_2)_2$:CaO ranging from 1.6 to 2.8.

The samples were prepared as follows: Ground phosphate rock (10.73 g) was added to each of thirteen 250-mL beakers. Ten mL (13.43 g) of 56.8 percent $HNO_3$ was pipetted into each beaker. A small amount of distilled water was added to ensure complete wetting of the samples. The samples were heated at 65° C. for a period of 2 hours. Ground urea (8.31, 8.83, 9.35, 9.87, 10.39, 10.91, 11.43, 11.95, 12.46, 12.98, 13.50, 14.02, and 14.54 g, respectively) was added to each beaker to give

TABLE II

Properties of Solid Products Prepared by Addition of Urea to 1.2 $HNO_3$:CaO Acidulates of Phosphate Rock

| Sample No. | Ratio urea:CaO | Melting point, °C. | Grade | $NO_3$—N, % | $P_2O_5$ solubility, % Water-soluble | $P_2O_5$ solubility, % Citrate-soluble | Phases identified[a] | Critical relative humidity at 25° C., % | pH[b] |
|---|---|---|---|---|---|---|---|---|---|
| 9 | 1.6 | 134–139 (decomposes) | 21.5—13.1—0 | 5.6 | 69.5 | 81.7 | N, CaNU, UN, Q | 46.9 | 2.36 |
| 10 | 1.8 | 134–137 (decomposes) | 22.3—12.8—0 | 5.3 | 64.8 | 77.3 | N, CaNU, UN, Q | 58.6 | 2.39 |
| 11 | 2.0 | 135–138 (decomposes) | 23.2—12.2—0 | 5.2 | 68.0 | 79.5 | N, CaNU, UN, CaP, Q | 59.4 | 2.46 |
| 12 | 2.2 | 137–139 (decomposes) | 23.8—11.7—0 | 5.0 | 69.2 | 82.1 | N, CaNU, CaUP, Q | 59.3 | 2.53 |
| 13 | 2.4 | 134–140 (decomposes) | 24.8—11.4—0 | 4.8 | 68.4 | 81.6 | N, CaNU, Q | 54.5 | 2.51 |
| 14 | 2.6 | 129–134 (decomposes) | 25.6—11.0—0 | 4.7 | 69.1 | 81.8 | CaNU, N, UP, Q | 57.3 | 2.52 |
| 15 | 2.8 | 114–124 (decomposes) | 26.3—10.8—0 | 4.4 | 67.6 | 81.5 | CaNU, N, UP, Q | 53.9 | 2.55 |
| 16 | 3.0 | 93–121 (decomposes) | 27.0—10.2—0 | 4.3 | 69.6 | 81.4 | CaNU, N, UP, U, Q | 50.1 | 2.58 |
| 17 | 3.2 | 100–110 (decomposes) | 27.6—10.0—0 | 4.1 | 70.0 | 83.0 | CaNU, N, UP, U, Q | 49.2 | 2.57 |
| 18 | 3.4 | 87–108 (decomposes) | 28.1—9.7—0 | 4.1 | 69.0 | 81.4 | CaNU, N, UP, U, Q | 44.7 | 2.59 |
| 19 | 3.6 | 78–92 (decomposes) | 28.7—9.5—0 | 3.9 | 67.4 | 82.1 | CaNU, UP, N, U, Q | 45.0 | 2.54 |
| 20 | 3.8 | 75–84 (decomposes) | 29.3—9.1—0 | 4.0 | 68.1 | 80.2 | CaNU, UP, U, N, Q | 44.2 | 2.56 |

[a] N = new compound — $Ca(H_2PO_4)(NO_3)\cdot CO(NH_2)_2$; CaP = $Ca(H_2PO_4)_2\cdot H_2O$; CaNU = $Ca(NO_3)_2\cdot 4CO(NH_2)_2$; UN = $CO(NH_2)_2\cdot HNO_3$; UP = $CO(NH_2)_2\cdot H_3PO_4$; CaUP = $Ca(H_2PO_4)_2\cdot 4CO(NH_2)_2$; Q = quartz.
[b] pH of 1% solution in water.

EXAMPLE III

Table III, infra, gives the physicochemical properties of solid urea-nitric phosphate fertilizer products made by reacting phosphate rock with nitric acid at a molar ratio, $HNO_3$:CaO = 1.4, followed by the addition of ratios urea:CaO of 1.6, 1.7, 1.8, 1.9, 2.0, 2.2, 2.3, 2.4, 2.5, 2.6, 2.7, and 2.8, respectively. The samples were thoroughly stirred and enough distilled water added to form a thick slurry to ensure complete mixing of the ingredients. The samples were oven-dried overnight at 55° C. and then vacuum dried, ground to a fine powder, and again vacuum dried.

TABLE III

Properties of Solid Products Prepared by Addition of Urea to 1.4 $HNO_3$:CaO Acidulates of Phosphate Rock

| Sample No. | Ratio urea:CaO | Melting point, °C. | Grade | $NO_3$—N, % | $P_2O_5$ solubility, % Water-soluble | $P_2O_5$ solubility, % Citrate-soluble | Phases identified[a] | Critical relative humidity at 25° C., % | pH[b] |
|---|---|---|---|---|---|---|---|---|---|
| 21 | 1.6 | >360 | 21.2—12.7—0 | 6.3 | 79.5 | 89.0 | N, CaNU, UN, Q | 34.2 | 2.35 |
| 22 | 1.7 | 146 (softens) | 21.7—12.5—0 | 6.2 | 79.2 | 88.5 | N, CaNU, UN, Q | 35.0 | 2.33 |
| 23 | 1.8 | 145 (softens) | 22.2—12.2—0 | 6.0 | 81.1 | 89.3 | N, CaNU, UN, Q | 38.2 | 2.36 |
| 24 | 1.9 | 140 (decomposes) | 22.6—11.9—0 | 5.9 | 80.6 | 89.9 | N, CaNU, UN, Q | 45.0 | 2.32 |
| 25 | 2.0 | 141 (decomposes) | 22.9—11.7—0 | 5.8 | 80.3 | 88.9 | N, CaNU, UN, Q | 56.3 | 2.35 |
| 26 | 2.1 | 142 (decomposes) | 23.3—11.5—0 | 5.6 | 80.0 | 88.7 | CaNU, N, UN, Q | 56.8 | 2.37 |
| 27 | 2.2 | 142 (decomposes) | 23.7—11.3—0 | 5.6 | 80.5 | 89.4 | CaNU, N, UN, Q | 56.7 | 2.40 |
| 28 | 2.3 | 142 (decomposes) | 24.0—11.2—0 | 5.4 | 80.4 | 89.3 | CaNU, N, UN, CaP, Q | 58.4 | 2.39 |
| 29 | 2.4 | 136 | 25.0—11.0—0 | 6.0 | 81.8 | 90.0 | CaNU, N, UN, CaP, Q | 60.9 | 2.40 |
| 30 | 2.5 | 136 | 24.7—10.7—0 | 5.4 | 82.2 | 89.7 | CaNU, N, UN, CaP, Q | 60.6 | 2.42 |
| 31 | 2.6 | 136 | 25.2—10.6—0 | 5.3 | 81.1 | 88.7 | CaNU, UN, N, CaP, Q | 59.2 | 2.38 |
| 32 | 2.7 | 133 | 25.5—10.5—0 | 5.2 | 80.0 | 88.6 | CaNU, UN, N, CaP, Q | 57.7 | 2.41 |

TABLE III-continued

Properties of Solid Products Prepared by Addition of Urea to 1.4 HNO$_3$:CaO Acidulates of Phosphate Rock

| Sample No. | Ratio urea:CaO | Melting point, °C. | Grade | NO$_3$—N, % | P$_2$O$_5$ solubility, % Water-soluble | Citrate-soluble | Phases identified[a] | Critical relative humidity at 25° C., % | pH[b] |
|---|---|---|---|---|---|---|---|---|---|
| 33 | 2.8 | (decomposes) 133 (decomposes) | 25.9—10.3—0 | 5.1 | 82.5 | 90.3 | CaNU, UN, CaP, N, Q | 55.6 | 2.39 |

[a]N = new compound—Ca(H$_2$PO$_4$)(NO$_3$).CO(NH$_2$)$_2$; CaP = Ca(H$_2$PO$_4$)$_2$.H$_2$O; CaNU = Ca(NO$_3$)$_2$.4CO(NH$_2$)$_2$; UN = CO(NH$_2$)$_2$.HNO$_3$; UP = CO(NH$_2$)$_2$.H$_3$PO$_4$; CaUP = Ca(H$_2$PO$_4$)$_2$.4CO(NH$_2$)$_2$; Q = quartz.
[b]pH of 1% solution in water.

EXAMPLE IV

Table IV below gives the physicochemical properties of solid urea-nitric phosphate fertilizer produced by reacting phosphate rock with nitric acid at a molar ratio, HNO$_3$:CaO=1.6, followed by addition of urea to give molar ratios, CO(NH$_2$)$_2$:CaO, ranging from 2.2 to 4.0. The samples were prepared as follows: Phosphate rock (9.39 g) was added to each of ten 250-mL beakers. Ten mL (10.43 g) of 56.8 percent HNO$_3$ was added to each beaker and the resulting acidulates were heated at about 65° C. for a period of one hour. Ground urea (10.00, 10.91, 11.82, 12.72, 13.63, 14.54, 15.45, 16.36, 17.27, and 18.18 g, respectively) was added to give molar ratios urea:CaO of 2.2, 2.4, 2.6, 2.8, 3.0, 3.2, 3.4, 3.6, 3.8, and 4.0, respectively. The samples were thoroughly stirred and a little distilled water was added to form a thick slurry and to ensure complete mixing. The samples were vacuum dried at room temperature, ground to a fine powder, and again vacuum dried.

EXAMPLE V

Table V below gives the physicochemical properties of solid urea-nitric phosphate fertilizer products produced by reacting phosphate rock with nitric acid at a molar ratio, HNO$_3$:CaO=1.8, followed by the addition of urea to give molar ratios, CO(NH$_2$)$_2$:CaO, ranging from 2.2 to 4.0. The samples were prepared as follows: Phosphate rock (8.34 g) was added to each of ten 250-mL beakers. Ten mL (10.43 g) of 56.8 percent HNO$_3$ was added to each beaker and the acidulates were heated at about 65° C. for a period of one hour. Ground urea (8.89, 9.69, 10.50, 11.31, 12.12, 12.93, 13.73, 14.54, 15.35, and 16.16 g., respectively) was added to give molar ratios urea:CaO of 2.2, 2.4, 2.6, 2.8, 3.0, 3.2, 3.4, 3.6, 3.8, and 4.0, respectively. The samples were thoroughly stirred and a little distilled water was added to form a thick slurry and to ensure complete mixing of the ingredients. The samples were vacuum dried at room temperature, ground to a fine powder, and again vacuum dried.

TABLE IV

Properties of Solid Products Prepared by Addition of Urea to 1.6 HNO$_3$:CaO Acidulates of Phosphate Rock

| Sample No. | Ratio urea:CaO | Melting point, °C. | Grade | NO$_3$—N, % | P$_2$O$_5$ solubility, % Water-soluble | Citrate-soluble | Phases identified[a] | Critical relative humidity at 25° C., % | pH[b] |
|---|---|---|---|---|---|---|---|---|---|
| 34 | 2.2 | 134–139 (decomposes) | 23.9—11.0—0 | 5.7 | 92.7 | 95.5 | CaNU, N, UN, Q | 48.7 | 2.34 |
| 35 | 2.4 | 135–139 (decomposes) | 24.9—10.5—0 | 5.4 | 90.5 | 94.3 | CaNU, N, UN, Q | 58.2 | 2.31 |
| 36 | 2.6 | 133–138 (decomposes) | 25.3—10.2—0 | 5.3 | 90.2 | 95.1 | CaNU, N, UN, Q | 59.1 | 2.19 |
| 37 | 2.8 | 133–137 (decomposes) | 25.9—9.9—0 | 5.1 | 88.9 | 91.9 | CaNU, N, UN, Q | 60.1 | 2.32 |
| 38 | 3.0 | 132–136 (decomposes) | 26.7—9.6—0 | 4.9 | 90.6 | 94.8 | CaNU, N, UN, Q | 58.6 | 2.32 |
| 39 | 3.2 | 133–138 (decomposes) | 27.1—9.4—0 | 4.7 | 91.5 | 94.7 | CaNU, UP, Q | 56.2 | 2.35 |
| 40 | 3.4 | 133–137 (decomposes) | 27.8—9.0—0 | 4.7 | 93.3 | 95.6 | CaNU, UP, Q | 56.9 | 2.40 |
| 41 | 3.6 | 124–128 (decomposes) | 28.3—8.8—0 | 4.6 | 92.0 | 95.5 | CaNU, N, UP, Q | 57.6 | 2.38 |
| 42 | 3.8 | 121–124 (decomposes) | 28.8—8.6—0 | 4.4 | 91.9 | 94.2 | CaNU, UP, Q | 53.4 | 2.36 |
| 43 | 4.0 | 108–120 (decomposes) | 29.3—8.3—0 | 4.3 | 91.6 | 96.4 | CaNU, UP, Q | 48.4 | 2.34 |

[a]N = new compound—Ca(H$_2$PO$_4$)(NO$_3$).CO(NH$_2$)$_2$; CaP = Ca(H$_2$PO$_4$)$_2$.H$_2$O; CaNU = Ca(NO$_3$)$_2$.4CO(NH$_2$)$_2$; UN = CO(NH$_2$)$_2$.HNO$_3$; UP = CO(NH$_2$)$_2$.H$_3$PO$_4$; CaUP = Ca(H$_2$PO$_4$)$_2$.4CO(NH$_2$)$_2$; Q = quartz
[b]pH of 1% solution in water.

uum dried.

TABLE V

Properties of Solid Products Prepared by Addition of Urea to 1.8 HNO$_3$:CaO Acidulates of Phosphate Rock

| Sample No. | Ratio urea:CaO | Melting point, °C. | Grade | NO$_3$—N, % | P$_2$O$_5$ solubility, % Water-soluble | Citrate-soluble | Phases identified[a] | Critical relative humidity at 25° C., % | pH[b] |
|---|---|---|---|---|---|---|---|---|---|
| 44 | 2.2 | 130 (softens) | 24.0—10.5—0 | 6.8 | 95.2 | 97.1 | N, CaNU, UN, Q | 35.5 | 2.13 |
| 45 | 2.4 | 128–131 (decomposes) | 24.6—10.2—0 | 6.6 | 96.1 | 98.0 | N, CaNU, UN, Q | 47.8 | 2.19 |
| 46 | 2.6 | 128–132 | 25.2—9.9—0 | 6.4 | 94.9 | 97.0 | CaNU, UN, N, Q | 58.0 | 2.21 |

TABLE V-continued

Properties of Solid Products Prepared by Addition of Urea to 1.8 $HNO_3$:CaO Acidulates of Phosphate Rock

| Sample No. | Ratio urea:CaO | Melting point, °C. | Grade | $NO_3$—N, % | $P_2O_5$ solubility, % Water-soluble | $P_2O_5$ solubility, % Citrate-soluble | Phases identified[a] | Critical relative humidity at 25° C., % | pH[b] |
|---|---|---|---|---|---|---|---|---|---|
| 47 | 2.8 | 133–134 (decomposes) | 25.8—9.7—0 | 6.1 | 94.8 | 96.9 | CaNU, UN, N, Q | 59.6 | 2.18 |
| 48 | 3.0 | 134–135 (decomposes) | 26.4—9.2—0 | 6.0 | 96.7 | 98.9 | CaNU, UN, N, Q | 59.9 | 2.20 |
| 49 | 3.2 | 128–133 (decomposes) | 27.0—9.0—0 | 5.8 | 94.4 | 96.7 | CaNU, UN, N, Q | 58.3 | 2.18 |
| 50 | 3.4 | 128–132 (decomposes) | 27.7—8.8—0 | 5.6 | 95.5 | 97.7 | CaNU, UN, N, UP, Q | 56.7 | 2.25 |
| 51 | 3.6 | 130–132 (decomposes) | 28.1—8.7—0 | 5.4 | 95.4 | 97.7 | CaNU, UP, N, UN, Q | 56.6 | 2.28 |
| 52 | 3.8 | 122–125 (decomposes) | 28.7—8.3—0 | 5.3 | 97.6 | 100 | CaNU, UP, N, Q | 57.1 | 2.30 |
| 53 | 4.0 | 120–123 (decomposes) | 29.0—8.2—0 | 5.2 | 97.6 | 100 | CaNU, UP, N, Q | 56.3 | 2.27 |

[a]N = new compound — $Ca(H_2PO_4)(NO_3).CO(NH_2)_2$; CaP = $Ca(H_2PO_4)_2.H_2O$; CaNU = $Ca(NO_3)_2.4CO(NH_2)_2$; UN = $CO(NH_2)_2.HNO_3$; UP = $CO(NH_2)_2.H_3PO_4$; CaUP = $Ca(H_2PO_4)_2.4CO(NH_2)_2$; Q = quartz.
[b]pH of 1% solution in water.

EXAMPLE VI

TABLE VI

Properties of Solid Products Prepared by Addition of Urea to 2.0 $HNO_3$:CaO Acidulates of Phosphate Rock

| Sample No. | Ratio urea:CaO | Melting point, °C. | Grade | $NO_3$—N, % | $P_2O_5$ solubility, % Water-soluble | $P_2O_5$ solubility, % Citrate-soluble | Phases identified[a] | Critical relative humidity at 25°C., % | pH[b] |
|---|---|---|---|---|---|---|---|---|---|
| 54 | 2.3 | 140 (decomposes) | 24.2—10.0—0 | 7.2 | 100 | 100 | CaNU, N, UN, Q | 35.5 | 2.06 |
| 55 | 2.5 | 139 (decomposes) | 25.0—9.8—0 | 6.9 | 100 | 100 | CaNU, N, UN, Q | 40.9 | 2.06 |
| 56 | 2.7 | 137 (decomposes) | 25.6—9.5—0 | 6.7 | 99 | 100 | CaNU, N, UN, Q | 55.6 | 2.06 |
| 57 | 2.9 | 130 (decomposes) | 26.2—9.2—0 | 6.6 | 99 | 100 | CaNU, N, UN, Q | 59.2 | 2.06 |
| 58 | 3.1 | 131 (decomposes) | 26.7—8.9—0 | 6.4 | 100 | 100 | CaNU, N, UN, Q | 59.8 | 2.07 |
| 59 | 3.3 | 130 (decomposes) | 27.2—8.7—0 | 6.2 | 99 | 100 | CaNU, UN, N, Q | 60.0 | 2.10 |
| 60 | 3.5 | 128 (decomposes) | 27.6—8.4—0 | 6.0 | 100 | 100 | CaNU, UN, N, Q | 59.1 | 2.10 |
| 61 | 3.7 | 128 (decomposes) | 28.2—8.3—0 | 5.9 | 99 | 100 | CaNU, UN, N, Q | 55.4 | 2.11 |
| 62 | 3.9 | 128 (decomposes) | 28.6—8.0—0 | 5.7 | 100 | 100 | CaNU, UN, N, Q | 57.2 | 2.11 |

[a]N = new compound — $Ca(H_2PO_4)(NO_3).CO(NH_2)_2$; CaP = $Ca(H_2PO_4)_2.H_2O$; CaNU = $Ca(NO_3)_2.4CO(NH_2)_2$; UN = $CO(NH_2)_2.HNO_3$; UP = $CO(NH_2)_2.H_3PO_4$; CaUP = $Ca(H_2PO_4)_2.4CO(NH_2)_2$; Q = quartz.
[b]pH of 1% solution in water.

Table VI below illustrates the physicochemical properties of solid urea-nitric phosphate fertilizer products produced by reacting phosphate rock with nitric acid at a molar ratio, $HNO_3$:CaO=2.0, followed by the addition of urea to give molar ratios, $CO(NH_2)_2$:CaO, ranging from 2.3 to 3.9.

The samples were prepared as follows: Phosphate rock (7.51 g) was added to each of nine 250-mL beakers. Ten mL (10.43 g) of 56.8 percent $HNO_3$ was added to each sample and the acidulates were heated at about 65° C. for a period of one hour. Ground urea (8.36, 9.09, 9.82, 10.54, 11.27, 12.00, 12.72, 13.45, and 14.18 g, respectively) was added to give molar ratios urea:CaO of 2.3, 2.5, 2.7, 2.9, 3.1, 3.3, 3.5, 3.7, and 3.9, respectively. Distilled water was added to form a thick slurry and to give good mixing of the ingredients. The samples were allowed to stand at room temperature for a period of 2 hours to ensure complete reaction of the urea. The samples then were vacuum dried, ground to a fine powder, and again vacuum dried.

EXAMPLE VII

Table VII below gives the physicochemical properties of solid urea-nitric phosphate fertilizer products prepared by reacting phosphate rock with nitric acid at a molar ratio, $HNO_3$:CaO=2.1, followed by the addition of urea to give molar ratios, $CO(NH_2)_2$:CaO, ranging from 2.2 to 4.0.

The samples were prepared as follows: Ground phosphate rock (7.15 g) was added to each of ten 250-mL beakers. Ten mL (10.43 g) of 56.8 percent $HNO_3$ was added to each sample and the acidulates were heated at about 65° C. for a period of one hour. Ground urea (7.62, 8.31, 9.00, 9.69, 10.39, 11.08, 11.77, 12.46, 13.16, and 13.85 g, respectively) was added to give molar ratios urea:CaO of 2.2, 2.4, 2.6, 2.8, 3.0, 3.2, 3.4, 3.6, 3.8, and 4.0, respectively. A little distilled water was added to form a thick slurry and to give complete mixing of the ingredients. The samples were then vacuum dried, ground to a fine powder, and again vacuum dried.

TABLE VII

Properties of Solid Products Prepared by Addition of Urea to 2.1 HNO$_3$:CaO Acidulates of Phosphate Rock

| Sample No. | Ratio urea:CaO | Melting point, °C. | Grade | NO$_3$—N, % | P$_2$O$_5$ solubility, % Water-soluble | P$_2$O$_5$ solubility, % Citrate-soluble | Phases identified[a] | Critical relative humidity at 25°C., % | pH[b] |
|---|---|---|---|---|---|---|---|---|---|
| 63 | 2.2 | >360 | 23.7—10.2—0 | 7.2 | 99.0 | 100 | N, CaNU, UN, Q | 34.2 | 2.11 |
| 64 | 2.4 | >360 | 24.5—9.9—0 | 6.9 | 99.0 | 100 | N, CaNU, UN, Q | 34.8 | 2.12 |
| 65 | 2.6 | 130–134 (decomposes) | 25.0—9.5—0 | 6.8 | 100 | 100 | CaNU, N, UN, Q | 41.5 | 2.10 |
| 66 | 2.8 | 126–131 (decomposes) | 25.8—9.3—0 | 6.6 | 100 | 100 | CaNU, N, UN, Q | 55.4 | 2.13 |
| 67 | 3.0 | 128–131 (decomposes) | 26.3—9.0—0 | 6.4 | 100 | 100 | CaNU, N, UN, CaP, Q | 58.2 | 2.13 |
| 68 | 3.2 | 125–130 (decomposes) | 26.6—8.8—0 | 6.2 | 100 | 100 | CaNU, UN, N, CaP, Q | 59.5 | 2.11 |
| 69 | 3.4 | 123–128 (decomposes) | 27.3—8.5—0 | 6.0 | 100 | 100 | CaNU, UN, N, CaP, Q | 59.1 | 2.13 |
| 70 | 3.6 | 124–127 (decomposes) | 27.7—8.3—0 | 5.8 | 100 | 100 | CaNU, UN, N, CaP, Q | 58.2 | 2.11 |
| 71 | 3.8 | 121–125 (decomposes) | 28.4—8.2—0 | 5.8 | 98.8 | 100 | CaNU, UN, CaP, N, Q | 53.4 | 2.14 |
| 72 | 4.0 | 119–125 (decomposes) | 28.7—7.9—0 | 5.6 | 100 | 100 | CaNU, UN, CaP, N, Q | 56.8 | 2.15 |

[a] N = new compound — Ca(H$_2$PO$_4$)(NO$_3$)·CO(NH$_2$)$_2$; CaP = Ca(H$_2$PO$_4$)$_2$·H$_2$O; CaNU = Ca(NO$_3$)$_2$·4CO(NH$_2$)$_2$; UN = CO(NH$_2$)$_2$·HNO$_3$; UP = CO(NH$_2$)$_2$·H$_3$PO$_4$; CaUP = Ca(H$_2$PO$_4$)$_2$·4CO(NH$_2$)$_2$; Q = quartz.
[b] pH of 1% solution in water.

INVENTION PARAMETERS

After sifting and winnowing through the data presented in the examples supra, as well as other data which we have assembled in discovering and developing the present invention, we have determined that the operable parameters of the present invention are as follows:

The mole ratio of nitric acid to calcium oxide present within the phosphate ore must be maintained within the range of about 1:1 to about 2:1. The preferred range of the mole ratio HNO$_3$:CaO for the production of N-P fertilizer products with high water-soluble P$_2$O$_5$ contents is between 1.2:1 and 2.1:1. The most preferred mole ratio of HNO$_3$:CaO for the production of N-P fertilizer products with 100 percent water-soluble P$_2$O$_5$ content is 2.0:1. However, very high water-soluble P$_2$O$_5$ contents may be achieved at lower acidulation ratios as shown by the examples.

The nitric acid-phosphate ore reaction conditions must be maintained within the range of 40° C. to 100° C. for a period of 0.5 to 3 hours. The preferred reaction conditions when acidulation is performed prior to the addition of urea are: reaction temperature, 60° C. to 70° C., and reaction time, 0.5 to 2 hours. The preferred stirring times after the addition of urea is 1 to 2 hours. The most preferred nitric acid-phosphate ore reaction condition when acidulation is performed prior to the addition of urea is: reaction temperature, 65° C. and reaction time, 1 hour. The most preferred stirring time after the addition of urea is 1.5 hours.

The preferred reaction conditions when nitric acid, phosphate ore, and urea are simultaneously added to the reactor are: reaction temperatures 50° C. to 60° C. for a period of 1 to 3 hours. The most preferred reaction conditions when nitric acid, phosphate ore, and urea are simultaneously added to the reactor are: reaction temperature, 55° C., and reaction time, 2 hours.

The mole ratio of urea:CaO within the reaction mixture must be maintained within the range of about 1.6–4. The preferred urea:CaO is dependent upon the desired product grade, hygroscopicity, and water-soluble P$_2$O$_5$ content as demonstrated by Examples II through VII, supra.

The preferred mole ratios, urea:CaO, when the HNO$_3$:CaO acidulation ratio is 1.2, are 1.6 to 3.8. The most preferred mole ratio urea:CaO is 2.2 in order to produce a N-P product of approximate grade 24-12-0, with a critical relative humidity of 59 percent and a P$_2$O$_5$ water solubility of 69 percent.

The preferred mole ratios, urea:CaO, when the HNO$_3$:CaO acidulation ratio is 1.4, are 1.6 to 2.8. The most preferred mole ratio urea:CaO is 2.4 in order to produce a N-P product of approximate grade 25-11-0 with a critical relative humidity of 61 percent and a P$_2$O$_5$ water solubility of 82 percent.

The preferred mole ratios, urea:CaO, when the HNO$_3$:CaO acidulation ratio is 1.6, are 2.2 to 4.0. The most preferred mole ratio urea:CaO is 2.8 in order to produce a N-P product of approximate grade 26-10-0, with a critical relative humidity of 60 percent and a P$_2$O$_5$ water solubility of 89 percent.

The preferred mole ratios, urea:CaO, when the HNO$_3$:CaO acidulation ratio is 1.8, are 2.2 to 4.0. The most preferred mole ratio urea:CaO is 3.0 in order to produce a N-P product of approximate grade 26-9-0, with a critical relative humidity of 60 percent and a P$_2$O$_5$ water solubility of 97 percent.

The preferred mole ratios, urea:CaO, when the HNO$_3$:CaO acidulation ratio is 2.0, are 2.3 to 3.9. The most preferred mole ratio urea:CaO is 3.3 in order to produce a N-P product of approximate grade 27-9-0, with a critical relative humidity of 60 percent and a P$_2$O$_5$ water solubility of 100 percent.

The preferred mole ratios, urea:CaO, when the HNO$_3$:CaO acidulation ratio is 2.1, are 2.2 to 4.0. The most preferred mole ratio urea:CaO is 3.2 in order to produce a N-P product of approximate grade 27-9-0, with a critical relative humidity of 60 percent and a P$_2$O$_5$ water solubility of 100 percent.

From considerations relating to manufacture, storage, transportation, and marketing of fertilizer products, it is normally assumed that the minimum acceptable critical relative humidity for such products should be about 55 percent. Some of the products selected from Tables II–VII, supra, have critical relative humidities slightly below this value but have been included in the broad claimed ranges because of other considerations.

The most preferred urea-nitric phosphate products prepared from a phosphate rock are summarized in Table VIII below. The selection is based primarily upon hygroscopicity considerations. Choices among these products will depend upon the desired grade and required $P_2O_5$ solubility.

TABLE VIII

Summary of Most Promising Urea-Nitric Phosphate Products

| Acidulation ratio $HNO_3:CaO$ | Ratio urea:CaO | Grade | Melting point, °C. | $P_2O_5$ solubility, % Water-soluble | $P_2O_5$ solubility, % Citrate-soluble | pH of 1% solution | Critical relative humidity at 25° C., % |
|---|---|---|---|---|---|---|---|
| 1.2 | 2.2 | 23.8—11.7—0 | 137–139 | 69.2 | 82.1 | 2.5 | 59.3 |
| 1.4 | 2.4 | 25.0—11.0—0 | 136 | 81.8 | 90.0 | 2.4 | 60.9 |
| 1.6 | 2.8 | 25.9—9.9—0 | 133–137 | 88.9 | 91.9 | 2.3 | 60.1 |
| 1.8 | 3.0 | 26.4—9.2—0 | 134–135 | 96.7 | 98.9 | 2.1 | 59.9 |
| 2.0 | 3.3 | 27.2—8.7—0 | 130 | 99.0 | 100 | 2.1 | 6.0 |
| 2.1 | 3.2 | 26.6—8.8—0 | 125–130 | 100 | 100 | 2.1 | 59.5 |

While we have shown and described particular embodiments of our invention, modifications and variations thereof will occur to those skilled in the art. We wish it to be understood, therefore, that the appended claims are intended to cover such modifications and variations which are within the true scope and spirit of our invention.

What we claim as new and desire to secure by Letters Patent of the United States is:

1. A new composition of matter having the molecular formula, $Ca(H_2PO_4)(NO_3) \cdot CO(NH_2)_2$, and having the following x-ray powder diffraction pattern:

| d, Å | I/Io | d, Å | I/Io |
|---|---|---|---|
| 12.45 | 100 | 2.319 | 7 |
| 5.12 | 18 | 2.178 | 7 |
| 4.73 | 12 | 2.078 | 3 |
| 4.63 | 8 | 2.071 | 3 |
| 4.61 | 5 | 1.991 | 1 |
| 4.135 | 9 | 1.971 | 2 |
| 3.914 | 20 | 1.922 | 3 |
| 3.902 | 35 | 1.829 | 1 |
| 3.875 | 40 | 1.790 | 2 |
| 3.214 | 27 | 1.775 | 4 |
| 3.170 | 16 | 1.691 | 3 |
| 3.140 | 45 | 1.568 | 2 |
| 3.105 | 20 | 1.460 | 1 |
| 2.915 | 3 | 1.397 | 1 |
| 2.844 | 19 | 1.281 | 1 |
| 2.720 | 2 | 1.273 | <1 |
| 2.644 | 14 | 1.242 | <1 |
| 2.558 | 2 | 1.217 | 1 |
| 2.505 | 11 | | |

2. A method for the preparation of solid urea nitric phosphate fertilizer products having agronomically advantageous low pHs ranging from about 1 to about 4 and having enhanced storage characteristics including high critical relative humidity, which process comprises the steps of:

(1) introducing into a reactor nitric acid and finely divided particulate phosphate rock in proportions such that the mole ratio of $HNO_3:CaO$ introduced and maintained in said reactor ranges from about 1.2 to about 2.1;

(2) maintaining the materials introduced into said reactor for a period of time ranging from about 30 minutes to about 2 hours at temperatures ranging between about 60° C. and about 100° C.;

(3) subsequently introducing into said reactor urea in proportions such that the mole ratio of urea:CaO in said reactor is adjusted to the range of between about 1.6 to about 4;

(4) maintaining the resulting materials in said reactor for a period of time ranging between about 1 and about 2 hours and at a temperature ranging from about 30° C. to about 70° C.; and (5) removing from said reactor the resulting urea nitric phosphate slurry to granulating, drying and sizing steps, respectively, wherefrom said sizing step is recovered onsize particulate urea nitric phosphate;

said product urea nitric phosphate characterized by the fact that the critical relative humidity thereof ranges upwards to about 60 percent, and the $P_2O_5$ water solubility thereof ranges upwards from about 70 percent.

3. The process of claim 2 wherein said $HNO_3:CaO$ acidulation mole ratio is about 1.2, wherein said urea:CaO mole ratio ranges between about 1.6 to about 3.2, wherein said urea nitric phosphate fertilizer product the critical relative humidity ranges from about 47 to about 60 percent, and the $P_2O_5$ water solubility is about 70 percent.

4. The process of claim 2 wherein said $HNO_3:CaO$ acidulation mole ratio is about 1.2, wherein said urea:CaO mole ratio ranges between about 1.8 to about 2.6, wherein said urea nitric phosphate fertilizer product the critical relative humidity ranges from about 55 to about 60 percent, and the $P_2O_5$ water solubility is about 70 percent.

5. The process of claim 2 wherein said $HNO_3:CaO$ acidulation mole ratio is about 1.2, wherein said urea:CaO mole ratio ranges between about 2 to about 2.2, wherein said urea nitric phosphate fertilizer product the critical relative humidity is about 60 percent, and the $P_2O_3$ water solubility is about 70 percent.

6. The process of claim 2 wherein said $HNO_3:CaO$ acidulation mole ratio is about 1.4, wherein said urea:CaO mole ratio ranges between about 2.0 to about 2.8, wherein said urea nitric phosphate fertilizer product the critical relative humidity ranges from about 55 to about 61 percent, and the $P_2O_5$ water solubility is about 80 percent.

7. The process of claim 2 wherein said $HNO_3:CaO$ acidulation mole ratio is about 1.4, wherein said urea:CaO mole ratio ranges between about 2.4 to about 2.5, wherein said urea nitric phosphate fertilizer product the critical relative humidity is about 61 percent, and the $P_2O_5$ water solubility is about 82 percent.

8. The process of claim 2 wherein said $HNO_3:CaO$ acidulation mole ratio is about 1.6, wherein said urea:CaO mole ratio ranges between about 2.2 to about 4.0, wherein said urea nitric phosphate fertilizer product the critical relative humidity ranges from about 50 to about 60 percent, and the $P_2O_5$ water solubility is about 90 percent.

9. The process of claim 2 wherein said $HNO_3$:CaO acidulation mole ratio is about 1.6, wherein said urea:CaO mole ratio ranges between about 2.4 to about 3.6, wherein said urea nitric phosphate fertilizer product the critical relative humidity ranges from about 56 to about 60 percent, and the $P_2O_5$ water solubility is about 90 percent.

10. The process of claim 2 wherein said $HNO_3$:CaO acidulation mole ratio is about 1.6, wherein said urea:CaO mole ratio is about 2.8, wherein said urea nitric phosphate fertilizer product the critical relative humidity is about 60 percent, and the $P_2O_5$ water solubility is about 90 percent.

11. The process of claim 2 wherein said $HNO_3$:CaO acidulation mole ratio is about 1.8, wherein said urea:CaO mole ratio ranges between about 2.4 to about 4.0, wherein said urea nitric phosphate fertilizer product the critical relative humidity ranges from about 50 to about 60 percent, and the $P_2O_5$ water solubility ranges from about 94 to about 98 percent.

12. The process of claim 2 wherein said $HNO_3$:CaO acidulation mole ratio is about 1.8, wherein said urea:CaO mole ratio ranges between about 2.6 to about 4.0, wherein said urea nitric phosphate fertilizer product the critical relative humidity ranges from about 56 to about 60 percent, and the $P_2O_5$ water solubility ranges from about 96 to about 100 percent.

13. The process of claim 2 wherein said $HNO_3$:CaO acidulation mole ratio is about 1.8, wherein said urea:CaO mole ratio is about 3.0, wherein said urea nitric phosphate fertilizer product the critical relative humidity is about 60 percent, and the $P_2O_5$ water solubility is about 99 percent.

14. The process of claim 2 wherein said $HNO_3$:CaO acidulation mole ratio is about 2.0, wherein said urea:CaO mole ratio ranges between about 2.7 to about 3.9, wherein said urea nitric phosphate fertilizer product the critical relative humidity ranges from about 55 to about 60 percent, and the $P_2O_5$ water solubility ranges from about 99 to about 100 percent.

15. The process of claim 2 wherein said $HNO_3$:CaO acidulation mole ratio is about 2.0 wherein said urea:CaO mole ratio is about 3.3, wherein said urea nitric phosphate fertilizer product the critical relative humidity is about 60 percent, and the $P_2O_5$ water solubility is about 99 percent.

16. The process of claim 2 wherein said $HNO_3$:CaO acidulation mole ratio is about 2.1, wherein said urea:CaO mole ratio ranges between about 2.8 to 4.0, wherein said urea nitric phosphate fertilizer product the critical relative humidity ranges from about 55 to about 60 percent, and the $P_2O_5$ water solubility ranges from about 98 to about 100 percent.

17. The process of claim 2 wherein said $HNO_3$:CaO acidulation mole ratio is about 2.1, wherein said urea:CaO mole ratio ranges between about 3.2 to about 3.4, wherein said urea nitric phosphate fertilizer product the critical relative humidity ranges from about 59 to about 60 percent, and the $P_2O_5$ water solubility is about 100 percent.

* * * * *

UNITED STATES PATENT AND TRADEMARK OFFICE
CERTIFICATE OF CORRECTION

PATENT NO. : 4,507,139

DATED : March 26, 1985

INVENTOR(S) : Jack M. Sullivan, Yong K. Kim, Kjell R. Waerstad

It is certified that error appears in the above-identified patent and that said Letters Patent is hereby corrected as shown below:

Columns 5 and 6, Table I, Sample No. 2, under Column "Grade $N-P_2O_5-K_2O$, wt%," after "34.1-0-0" omit "-"

Column 8, line 36, under Table I-A, after "$(NO_3)$" and before "$CO(NH_2)_2$" insert the symbol of hydration, to wit -- . --

Columns 11 and 12, Table IV, Sample No. 34, under Column "Melting point, °C," change "134" to -- 132 --

Columns 11 and 12, Table IV, Sample No. 41, under Column "Phases identified[a]," after "$C_aNU$," and before "UP," delete -- N --

Columns 17 and 18, Table VIII, Acidulation ratio $HNO_3$:CaO 2.0, under Column "Critical relative humidity at 25° C,%," change "6.0" to -- 60.0 --

Column 18, line 48, change "$P_2O_3$" to -- $P_2O_5$ --

Column 20, Claim 13, line 2, change "99" to -- 97 --

Signed and Sealed this

Twenty-seventh Day of August 1985

[SEAL]

Attest:

DONALD J. QUIGG

Attesting Officer — Acting Commissioner of Patents and Trademarks